United States Patent
Harris

(10) Patent No.: US 9,168,974 B2
(45) Date of Patent: Oct. 27, 2015

(54) CABLE-ACTUATED DISC BRAKE FOR A BICYCLE

(71) Applicant: Jonathan K. Harris, Tulsa, OK (US)

(72) Inventor: Jonathan K. Harris, Tulsa, OK (US)

(*) Notice: Subject to any disclaimer, the term of this patent is extended or adjusted under 35 U.S.C. 154(b) by 167 days.

(21) Appl. No.: 13/861,561

(22) Filed: Apr. 12, 2013

(65) Prior Publication Data

US 2014/0305750 A1    Oct. 16, 2014

(51) Int. Cl.

| | |
|---|---|
| *B62L 1/00* | (2006.01) |
| *F16D 55/228* | (2006.01) |
| *F16D 65/097* | (2006.01) |
| *F16D 65/46* | (2006.01) |
| *F16D 55/00* | (2006.01) |
| *F16D 121/14* | (2012.01) |
| *F16D 125/36* | (2012.01) |
| *F16D 125/60* | (2012.01) |

(52) U.S. Cl.
CPC ............... *B62L 1/005* (2013.01); *F16D 55/228* (2013.01); *F16D 65/0977* (2013.01); *F16D 65/46* (2013.01); *F16D 2055/007* (2013.01); *F16D 2121/14* (2013.01); *F16D 2125/36* (2013.01); *F16D 2125/60* (2013.01)

(58) Field of Classification Search
CPC ............ F16D 2125/36; F16D 2125/32; F16D 55/228; F16D 65/0977; B62L 1/00; B62L 1/005

USPC .................................................. 188/26, 24.22
See application file for complete search history.

(56) References Cited

U.S. PATENT DOCUMENTS

| | | | | |
|---|---|---|---|---|
| 1,612,356 A | * | 12/1926 | Bregoz .......................... | 188/71.4 |
| 1,613,541 A | * | 1/1927 | Smith ........................... | 188/72.8 |
| 4,768,624 A | * | 9/1988 | Green et al. ................... | 188/71.4 |
| 5,203,434 A | * | 4/1993 | Teeter et al. .................. | 188/70 R |
| 5,979,609 A | * | 11/1999 | Tsai ................................. | 188/26 |
| 6,148,964 A | * | 11/2000 | Huang ............................. | 188/26 |

FOREIGN PATENT DOCUMENTS

| | | | | |
|---|---|---|---|---|
| EP | | 542134 A1 * | 5/1993 | ............... B62L 1/00 |
| EP | | 2444309 A1 | 4/2012 | |

\* cited by examiner

*Primary Examiner* — Xuan Lan Nguyen
(74) *Attorney, Agent, or Firm* — Head, Johnson & Kachigian, P.C.

(57) ABSTRACT

The invention relates to a cable-actuated disc brake for a bicycle. The cable-actuated disc brake has a lever with dual, opposing piston assemblies that limit the movement of brake pads in relation to a brake disc of the bicycle. The lever includes symmetrical lever arms respectively engaged with symmetrical piston assemblies that are axially spaced, coaxially aligned and rotate about a pivot axis to selectively engage brake pads with a brake disc of the bicycle.

21 Claims, 13 Drawing Sheets

CABLE-ACTUATED DISC BRAKE FOR A BICYCLE

CROSS REFERENCE TO RELATED APPLICATIONS

Not Applicable.

BACKGROUND OF THE INVENTION

1. Field of the Invention

This invention relates generally to a cable-actuated disc brake for a bicycle, and more particular to an improved cable-actuated disc brake for a bicycle having a lever body with dual, opposing pistons that limit the movement of brake pads in relation to a brake disc of the bicycle.

2. Description of the Related Art

Bicycling is a popular recreation and competitive sport. Bicycles and their components are continually being improved and redesigned. One particular component that is continually being redesigned for improved efficiency is the bicycle's brake system. Many recent improvements have been made to disc brake systems that provide a high performance brake system with a substantial braking power in relationship to the amount of braking force applied to the brake lever. Moreover, disc brake systems typically provide a high level of consistency in all types of weather and riding conditions. Of course, riders constantly desire better performance from disc brake systems, i.e., disc brake systems that have more braking power and that reduce the overall weight of the bicycle.

It is therefore desirable to provide an improved cable-actuated disc brake for a bicycle.

It is further desirable to provide a cable-actuated disc brake for a bicycle having a lever body with dual, opposing pistons that limit the movement of brake pads in relation to a brake disc of the bicycle.

It is still further desirable to provide a cable-actuated disc brake for a bicycle having a lever body with symmetrical pistons to ensure even wear on the brake pads.

It is yet further desirable to provide a cable-actuated disc brake for a bicycle having a spring for maintaining compression on the brake pads during brake cable movement.

It is still yet further desirable to provide a cable-actuated disc brake for a bicycle that does not utilize ball bearings within tapered channels for maintaining compression of the brake pads during brake cable movement.

It is still yet further desirable to provide an improved cable-actuated disc brake for a bicycle having a micro-adjust sprocket to make small adjustments to the position of the brake pads as the brake pads wear from use.

BRIEF SUMMARY OF THE INVENTION

In general, in a first aspect, the invention relates to a cable-actuated disc brake for a bicycle. The disc brake includes a caliper body attachable to a fork of the bicycle having a brake pad channel. The disc brake also includes a lever having a first end with symmetrical lever arms and a second end with a brake cable attachment mechanism. The lever is pivotable about a pivot axis. The disc brake further includes a pair of symmetric piston assemblies connected to the lever arms of the lever. The piston assemblies are axially aligned and coaxially spaced about the brake pad channel of the caliper body. Each of the piston assemblies are pivotable about the pivot axis, and each of the piston assemblies are in contact with a disc brake pad positioned within the brake pad channel of the caliper body. The piston assemblies transform rotary motion of the lever to linear motion of the brake pads. The disc brake can include a return spring in connection with the brake pads for biasing the brake pads toward a neutral position The caliper body of the disc brake may also include a pair of polygonal receptacles separated by the brake pad channel with a portion of the piston assemblies respectively positioned within the receptacles of the caliper body. Further, a portion of the piston assemblies can be respectively covered by a caliper plate selectively attachable to the caliper body. The brake cable attachment mechanism can include a cable clamp selectively securable to a brake cable, and a cable feed can be part of the caliper body through which the brake cable is directed through.

The piston assemblies can include an inboard piston assembly and an outboard piston assembly. Each of the piston assemblies may include a spring armature connected to the lever arms of the lever, respectively, and a cam in contact with the brake pads, respectively. Each of the spring armatures can further include an outer armature body and an inner armature body having a biasing spring intermediate thereof. Each of the outer armature bodies may have a splined head connected to a splined aperture in the first end of the lever, a series of tapered ridges and terminal shoulders, and/or a channel therein. Similarly, each of the inner armature bodies can include a series of tapered ridges and terminal shoulders that mate with the tapered ridges and terminal shoulders of the outer armature bodies. Each of the ridges and shoulders of the inner armature bodies can also include a channel mating with the channel of the outer armature bodies. The biasing spring intermediate of each of the outer armature bodies and the inner armature bodies can be retained within opposing projections in communication with receptacles within the channels of the outer armature bodies and the inner armature bodies. In addition, each of the inner armature bodies can have a polygonal peripheral configuration for connection with a polygonal configuration of a pair of polygonal receptacles separated by the brake pad channel of the caliper body.

Furthermore, each of the armature bodies can have a central bore in communication with the cam. The cam may have an inner face in connection with the brake pad, respectively, and an outer face in connection with a micro-adjusting fastener. The outer face of the cam may have an internally threaded bore engaged with external threads of the micro-adjusting fastener.

In general, in a second aspect, the invention relates to a cable-actuated disc brake for a bicycle having a caliper body attachable to a fork of the bicycle. The caliper body has a brake pad channel having a pair of disc brake pads positioned therein. A return spring is positioned intermediate of and in connection with the brake pads for biasing the brake pads toward a neutral position. The disc brake includes a lever having a first end having symmetrical lever arms with splined apertures therein, and a second end having a brake cable attachment mechanism. The lever is pivotable about a pivot axis. The disc brake further includes an inboard piston assembly and an outboard piston assembly, with the inboard piston assembly and the outboard piston assembly being mirror images of each other. Each of the piston assemblies is connected to the lever arms of the lever, and the piston assemblies are axially aligned and coaxially spaced about the brake pad channel of the caliper body. Each of the piston assemblies is pivotable about the pivot axis. In addition, each of the piston assemblies is in contact with one of the disc brake pads positioned within the brake pad channel of the caliper body. Further, each of the piston assemblies includes a spring armature connected to the lever arms of the lever, respectively, and a cam in contact with the brake pads, respectively. Moreover, each of the spring armatures includes an outer armature body and an inner armature body with a biasing spring intermediate thereof. Each of the outer armature bodies has a splined head connected to the splined aperture in the first end of the lever, a series of tapered ridges and terminal shoulders, and a channel therein. Each of the inner armature bodies has a series of tapered ridges and terminal shoulders that mate with the tapered ridges and terminal shoulders of the outer armature bodies. Each of the ridges and shoulders has a channel therein mating with the channel of the outer armature bodies. The biasing spring is retained within the channels of the outer armature bodies and the inner armature bodies. The piston assemblies transform rotary motion of the lever to linear motion of the brake pads.

The caliper body may include a pair of polygonal receptacles separated by the brake pad channel, with a portion of the piston assemblies respectively being positioned within the receptacles of the caliper body and at portion of the piston assemblies respectively being covered by a caliper plate selectively attachable to the caliper body. The brake cable attachment mechanism of the disc brake can include a cable clamp selectively securable to a brake cable, and the caliper body can include a cable feed through which the brake cable is directed through.

Each of the inner armature bodies of the piston assemblies may have a polygonal peripheral configuration for connection with a polygonal configuration of a pair of polygonal receptacles separated by the brake pad channel of the caliper body. Moreover, the biasing spring may have opposing projections in communication with receptacles within the channels of the outer armature bodies and the inner armature bodies. Furthermore, each of the armature bodies can have a central bore in communication with the cam, with each of the cams having an inner face in connection with the brake pad, respectively, and an outer face in connection with a micro-adjusting fastener. Additionally, the outer face of the cam can have an internally threaded bore engaged with external threads of the micro-adjusting fastener.

Figure 1:
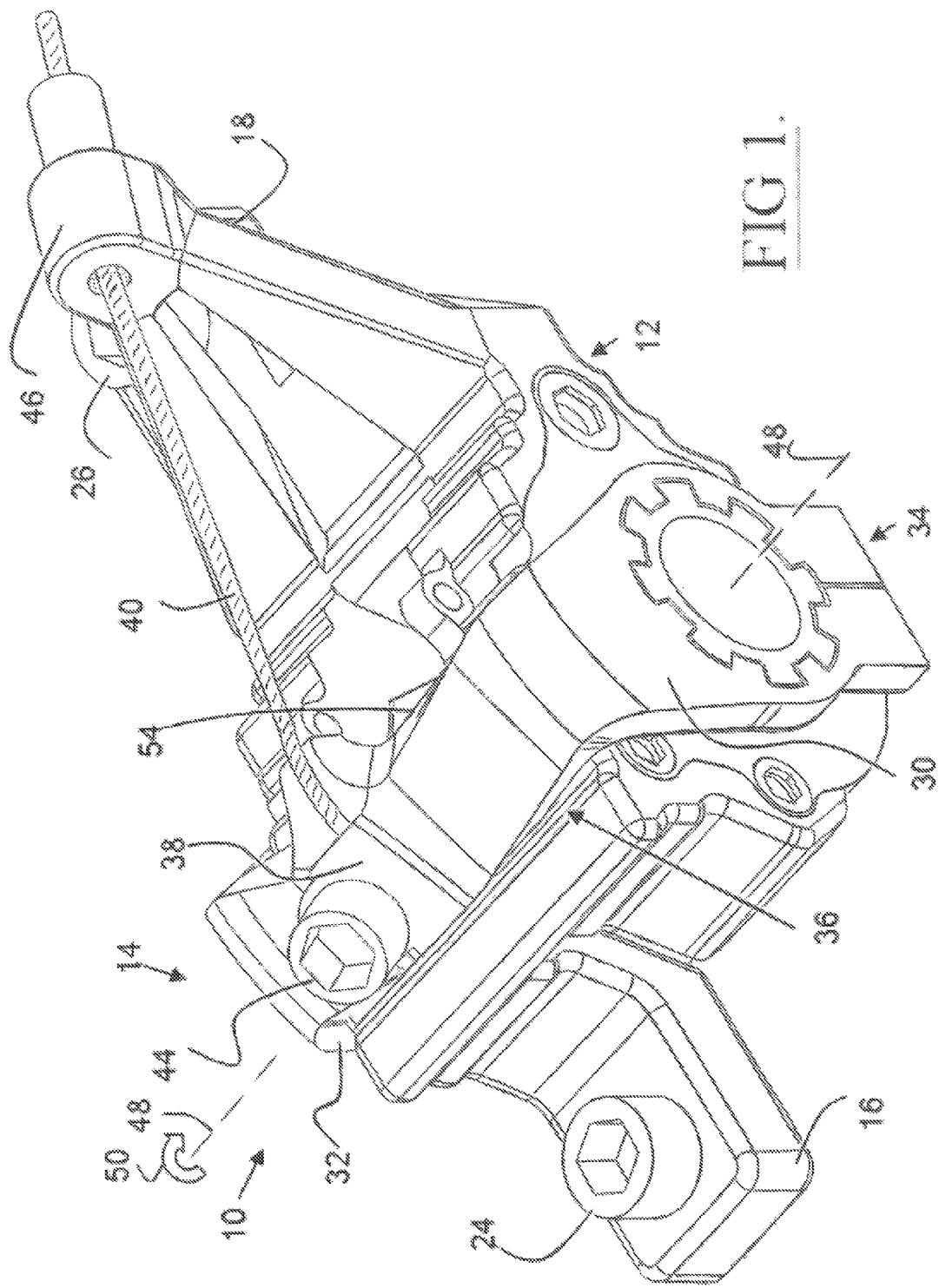
FIG. 1 is a perspective view of an example of a disc brake with a lever in a neutral position in accordance with an illustrative embodiment of the cable-actuated disc brake for a bicycle disclosed herein.
Figure 2:
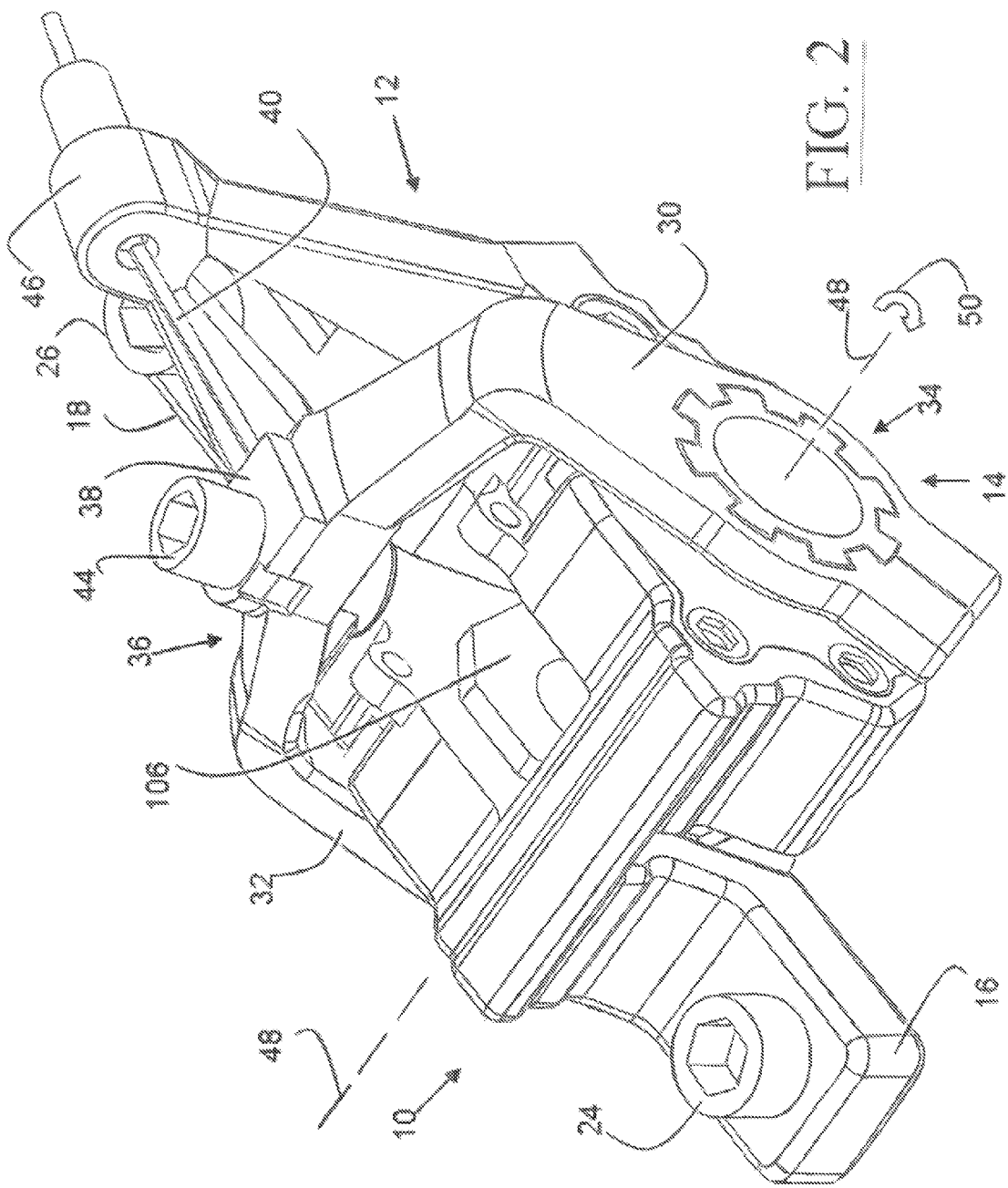
FIG. 2 is a perspective view of the disc brake illustrated in FIG. 1 with the lever actuated to a braking position.
Figure 3:
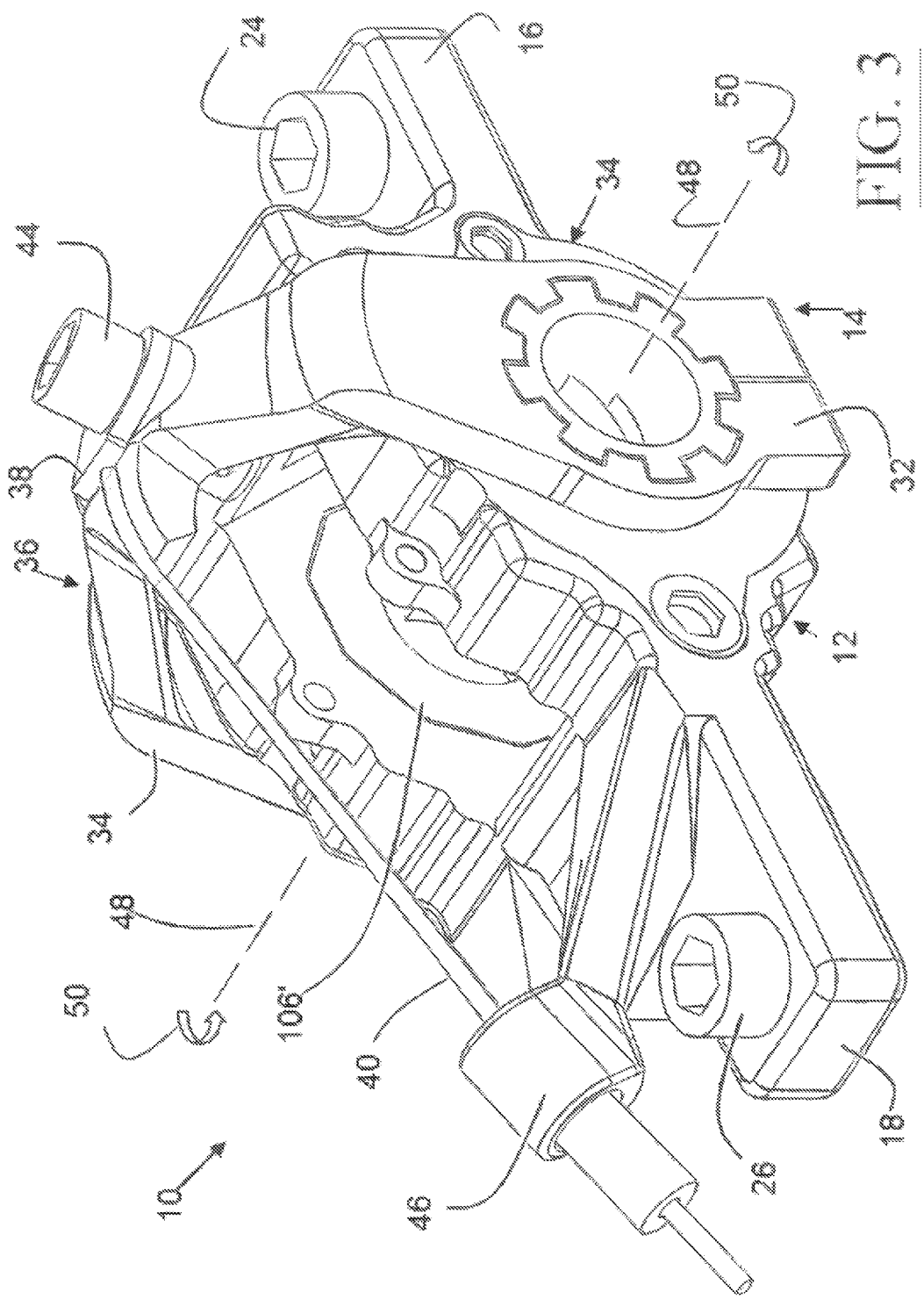
FIG. 3 is a perspective view of the example of the disc brake shown in FIG. 1 with the lever in a neutral position.
Figure 4:
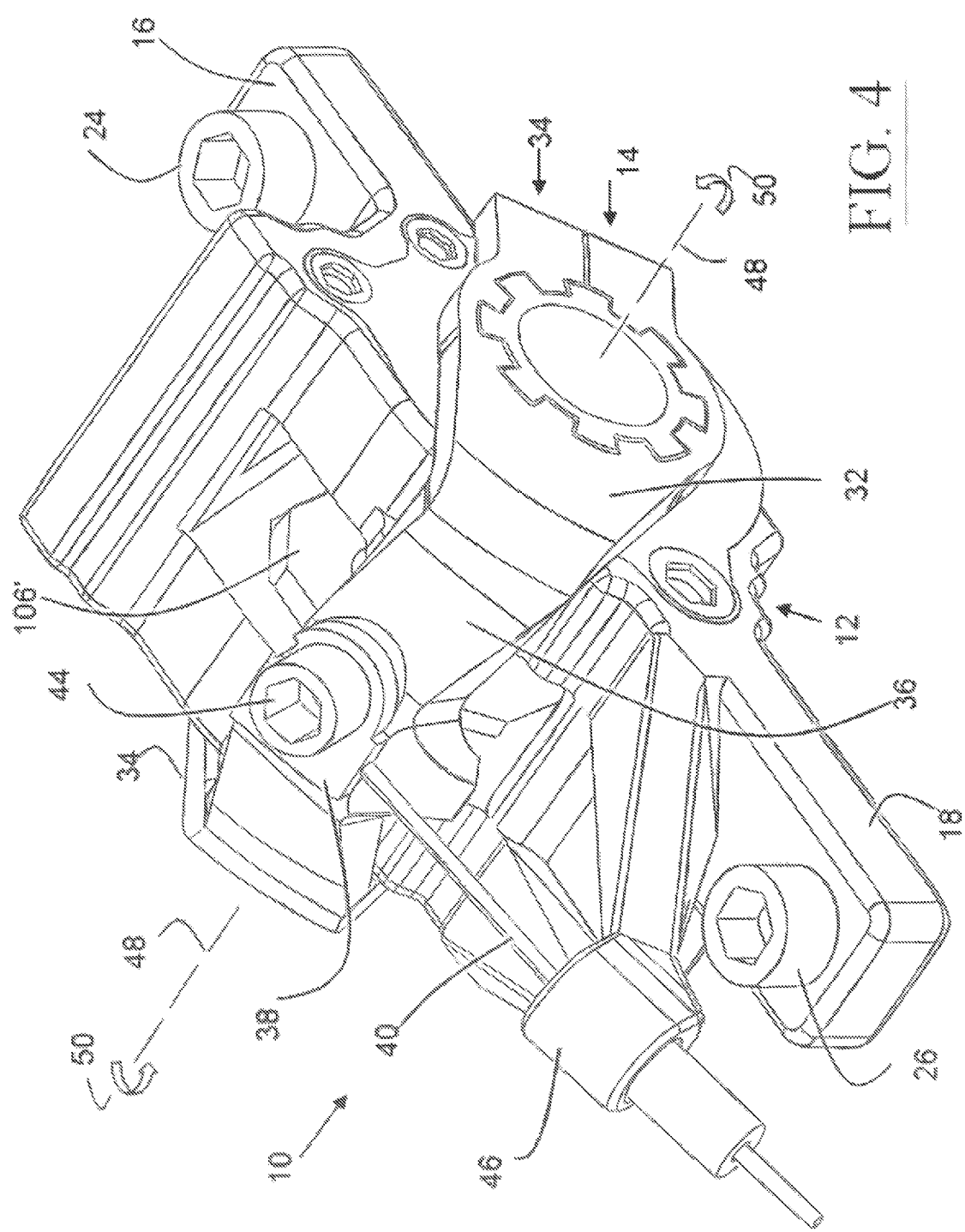
FIG. 4 is a perspective view of the disc brake illustrated in FIG. 2 with the lever actuated to a braking position.
Figure 5:
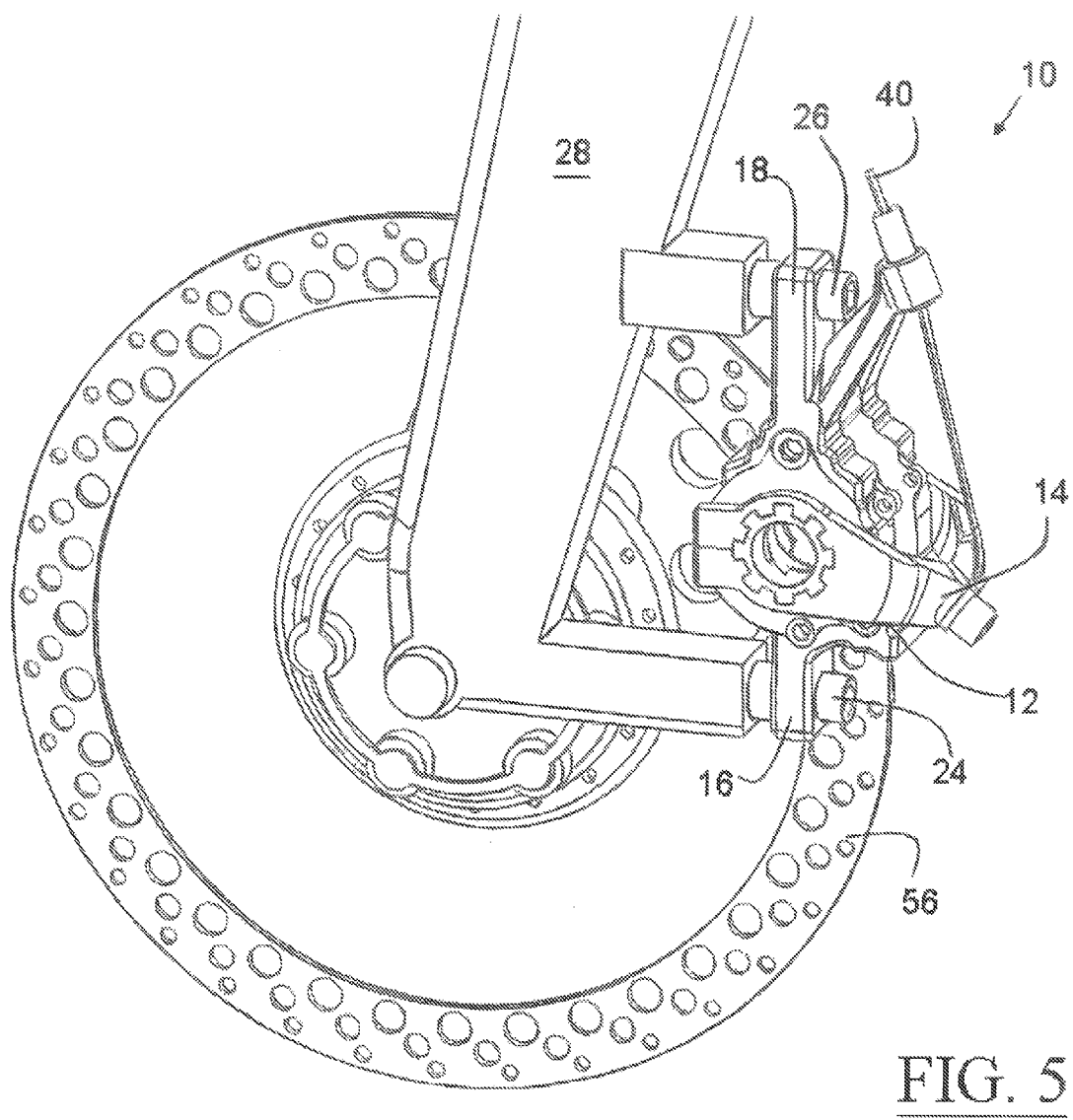
FIG. 5 is a perspective view of an example of the disc brake mounted to a fork of a bicycle with the lever in a neutral position in accordance with an illustrative embodiment of the cable-actuated disc brake for a bicycle disclosed herein.
Figure 6:
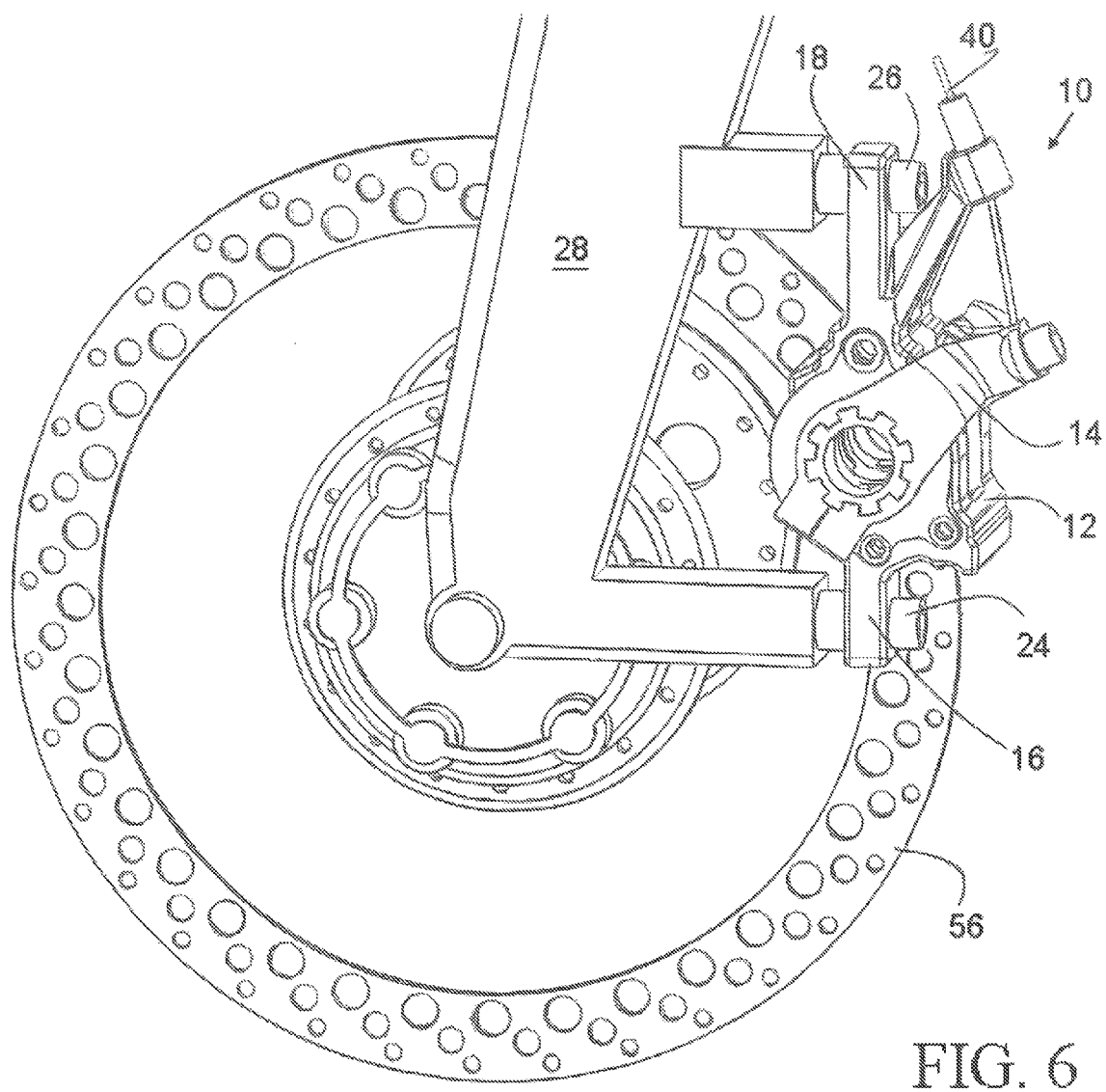
FIG. 6 is a perspective view of the disc brake illustrated in FIG. 5 with the lever actuated to a braking position in order to operatively engage the brake pads with a brake disc.
Figure 7:
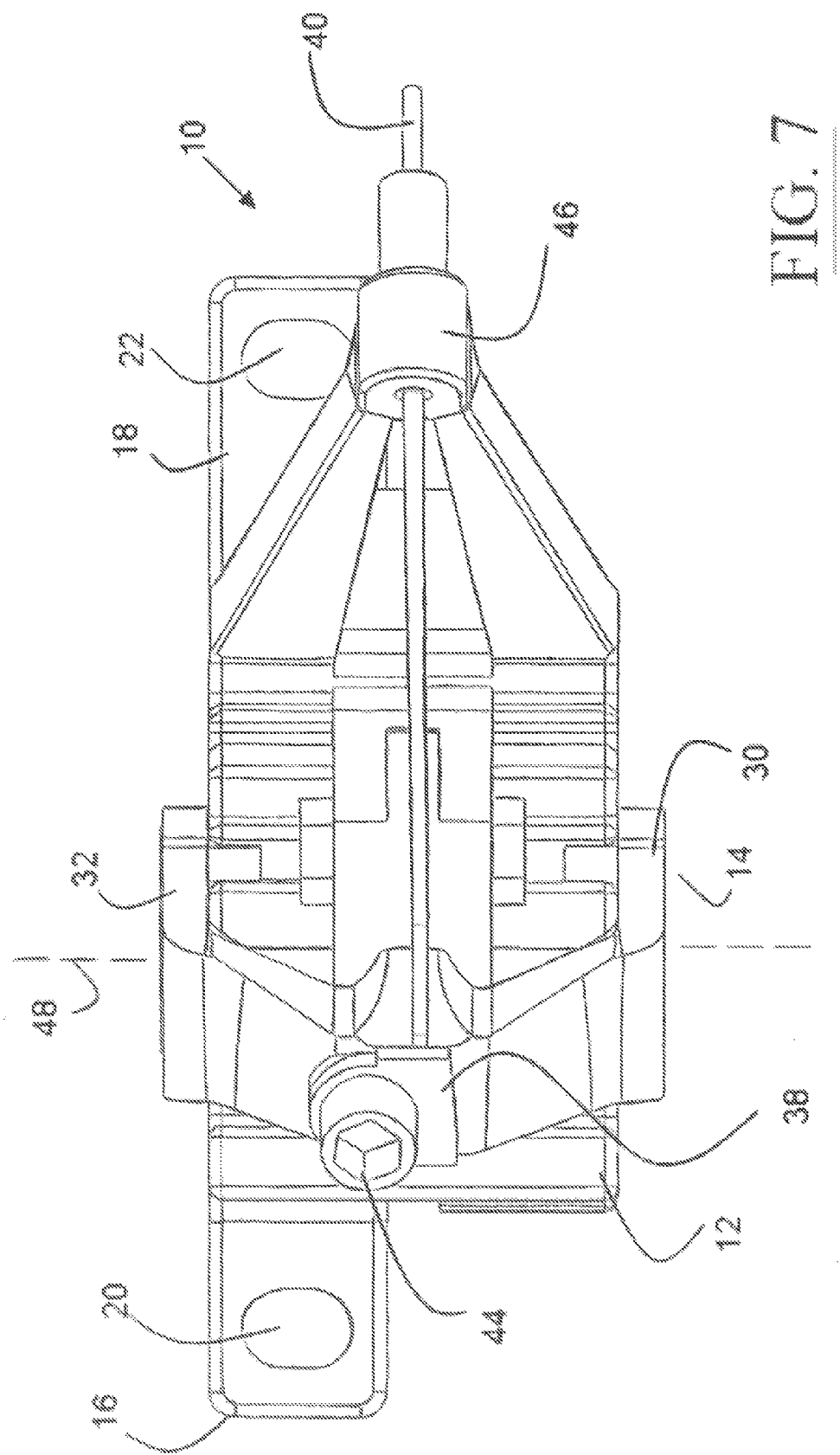
FIG. 7 is a top plan view of an example of a disc brake with the lever in a neutral position in accordance with an illustrative embodiment of the cable-actuated disc brake for a bicycle disclosed herein.
Figure 8:
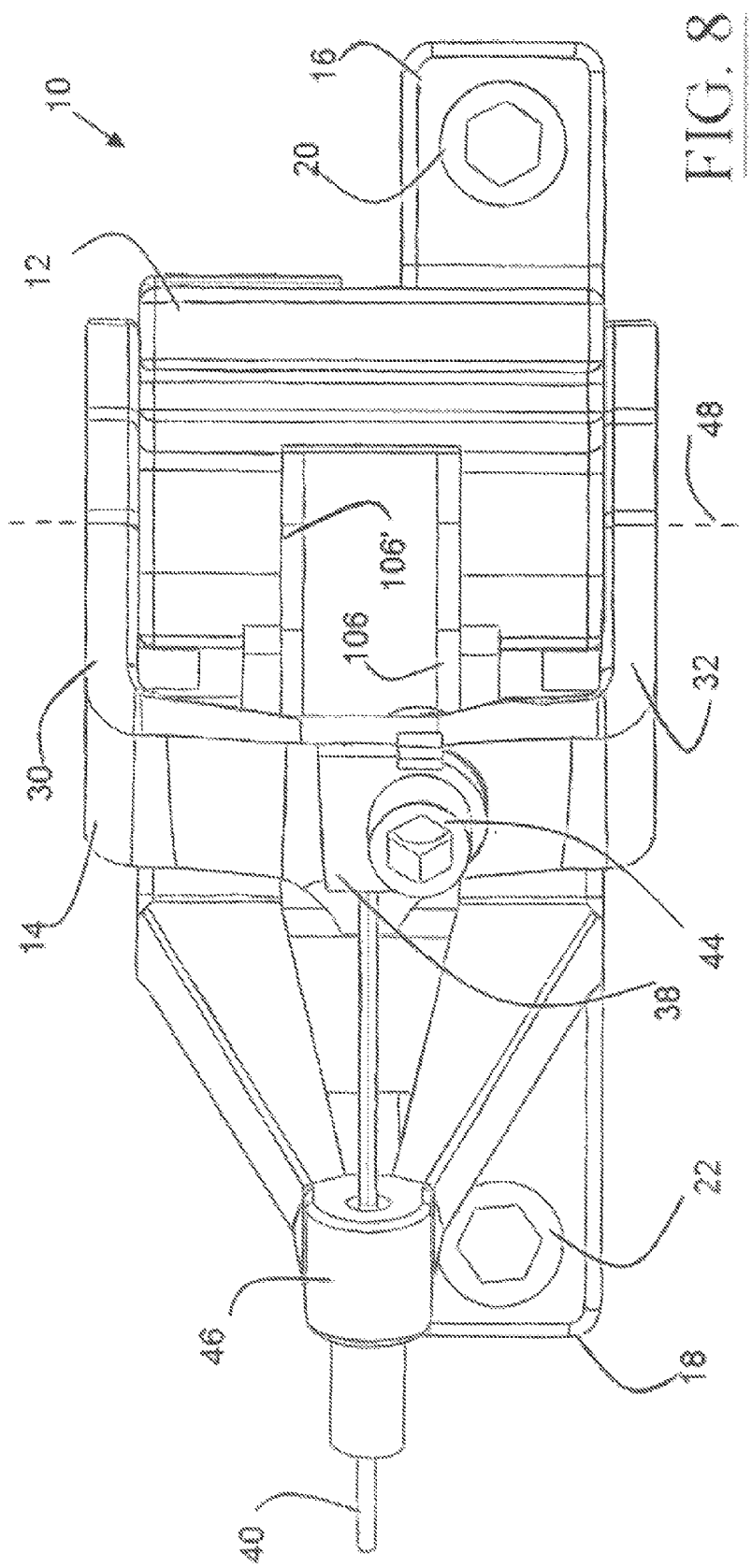
FIG. 8 is a top plan view of the disc brake shown in FIG. 7 with the lever actuated to a braking position in accordance with an illustrative embodiment of the cable-actuated disc brake for a bicycle disclosed herein.

Other advantages and features of the invention will be apparent from the following description and from the claims.

DETAILED DESCRIPTION OF THE INVENTION

The devices discussed herein are merely illustrative of specific manners in which to make and use this invention and are not to be interpreted as limiting in scope.

While the invention has been described with a certain degree of particularity, it is to be noted that many modifications may be made in the construction and the arrangement of the structural and function details disclosed herein without departing from the scope of the invention. It is understood that the invention is not limited to the embodiments set forth herein for purposes of exemplification.

The description of the invention is intended to be read in connection with the accompanying drawings, which are to be considered part of the entire written description of this invention. In the description, relative terms such as "front," "rear," "lower," "upper," "horizontal," "vertical," "inward," "outward," "up," "down," "top" and "bottom" as well as derivatives thereof (e.g., "horizontally," "downwardly," "upwardly" etc.) should be construed to refer to the orientation as then described or as shown in the drawings under discussion. These relative terms are for convenience of description and do not require that the device be constructed or the method to be operated in a particular orientation. Terms, such as "connected," "connecting," "attached," "attaching," "join" and "joining" are used interchangeably and refer to one structure or surface being secured to another structure or surface or integrally fabricated in one piece.

In general, the invention relates to a cable-actuated disc brake for a bicycle. The disc brake has a pair of brake pads that are movably mounted to a caliper housing. The brake pads are pressed against a brake disc or rotor that is fixed to the wheel to halt the rotation of the disc and thus the wheel of the bicycle. The brake pads are moved toward the disc mechanically by a spring-biased piston. The return spring moves the brake pads from the braking position back to the neutral position. The position of the brake pads are adjustable for regulating the biasing force developed by the return spring and also to fine-tune the distance between the brake pads as the brake pads wear from usage.

Referring to the figures of the drawings, wherein like numerals of reference designate like elements throughout the several views, the disc brake 10 includes a caliper housing 12 having a pair of generally opposing mounting feet 16, 18 extending therefrom. Each of the mounting feet 16, 18 includes an orifice 20, 22 through which a suitable fastener 24, 26 passes in order to attach the caliper housing 12 to a fork 28 of the bicycle. A lever 14 includes a pair of symmetrical arms 30, 32 extending from a first end 34 of the lever 14. The lever arms 30, 32 are pivotally attached to the caliper housing 12. A second end 36 of the lever 14 includes a cable clamp 38 that secures an end of the brake cable 40. The second end 36 of the lever 14 includes an orifice 42 through which a suitable fastener 44 passes in order to attach the brake cable 40 to the lever 14. The brake cable 40 is directed through a cable feed 46 extending from the caliper housing 12. During operation, the disc brake 10 is actuated between the neutral position illustrated in FIGS. 1, 3, 5 and 7 and the braking position illustrated in FIGS. 2, 4, 6 and 8 by tension being applied to an opposite end of the cable 40 by a brake lever (not shown). This tension causes the lever 14 to pivot about pivot axis 48 in the direction of arrow 50 so that the second end 36 of the lever 14 is drawn toward the cable feed 46 of the caliper body 12 to advance each of the brake pads 13, 15 into contact with the brake disc 56 by a rotary to linear piston assembly between the lever arms 30, 32 extending from the first end 34 of the lever 14 and the brake pads 13, 15.

Figure 9:
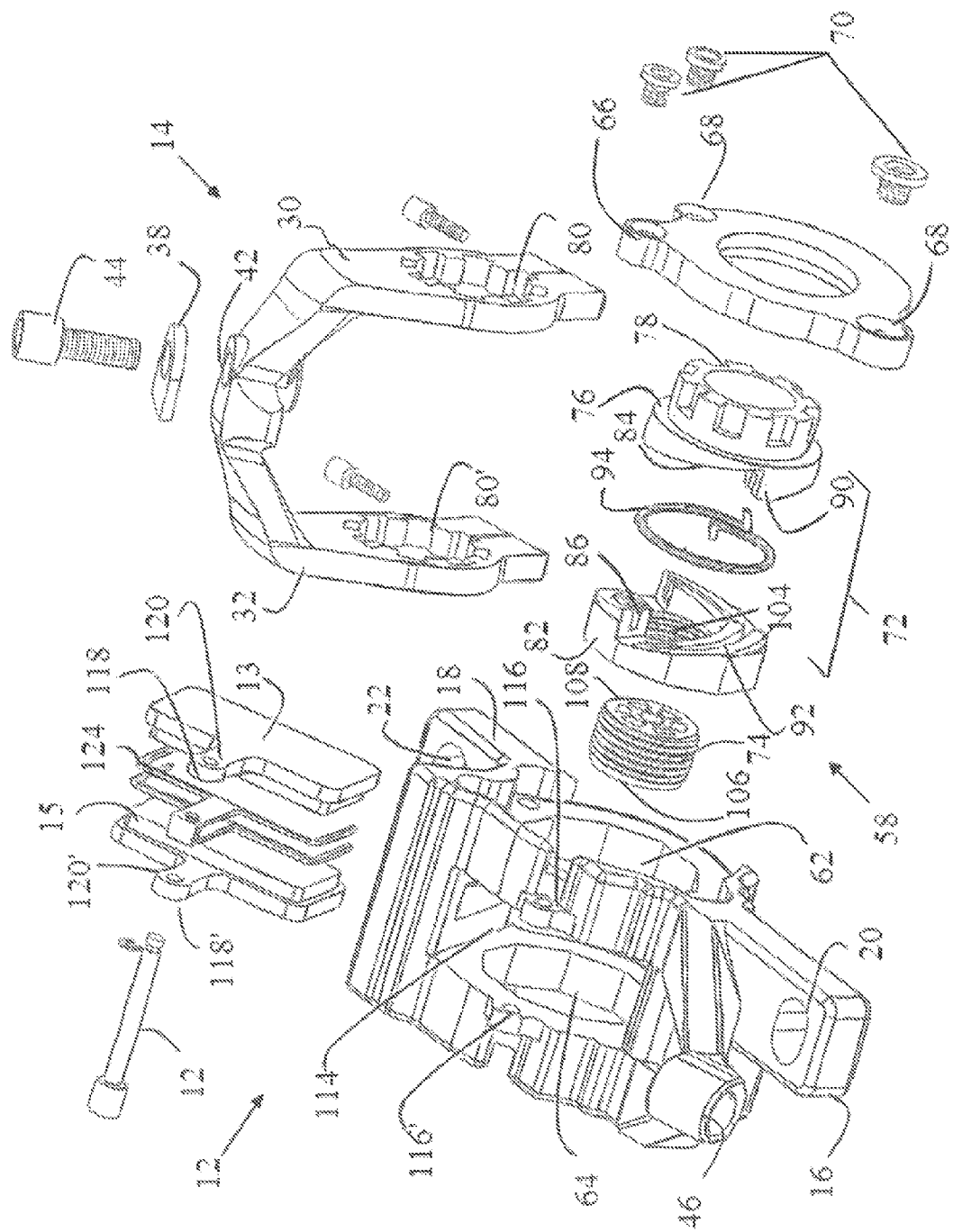
FIG. 9 is an exploded view of an example of a disc brake in accordance with an illustrative embodiment of the cable-actuated disc brake for a bicycle disclosed herein.
Figure 10:
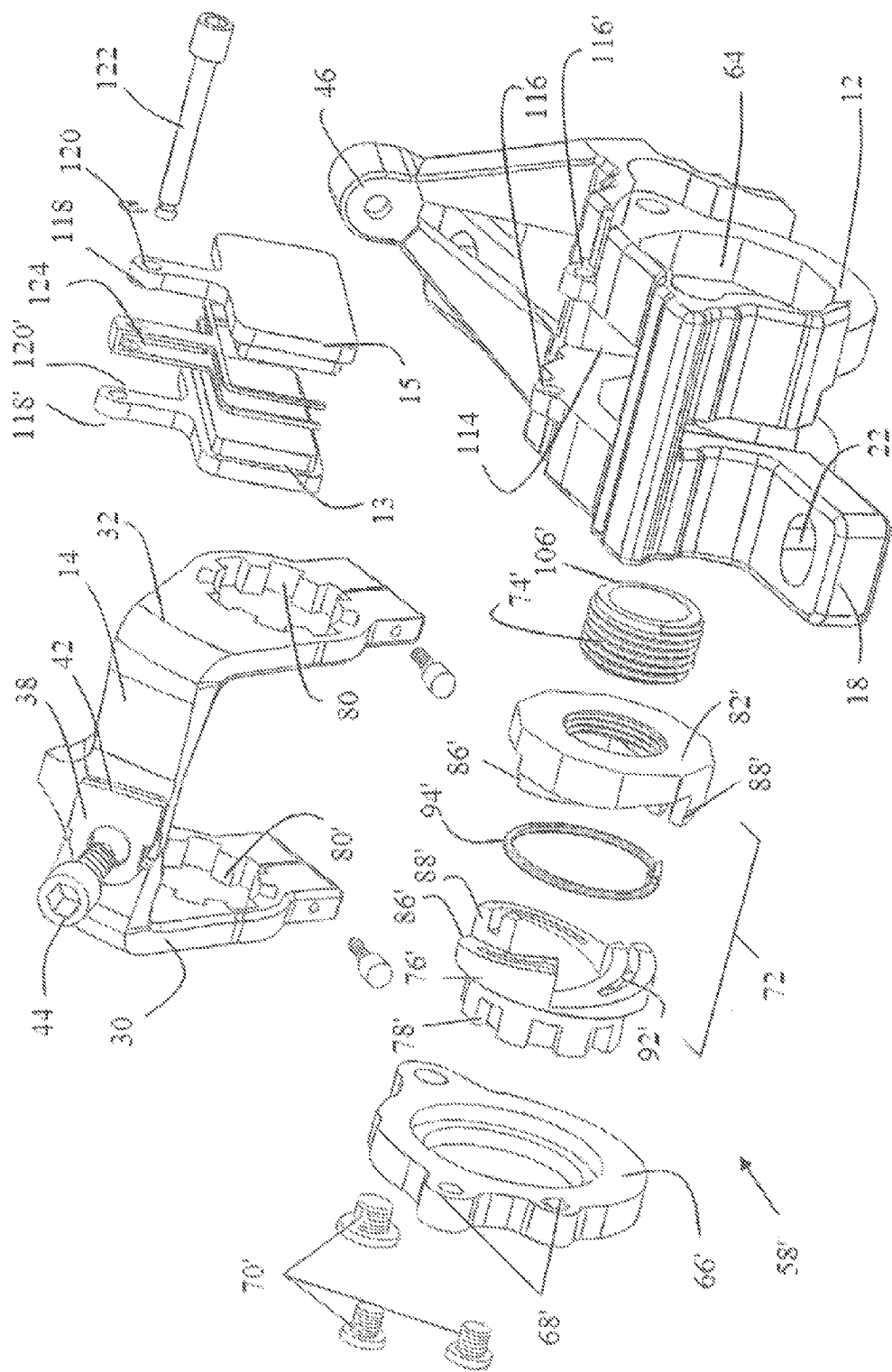
FIG. 10 is another exploded view of an example of a disc brake in accordance with an illustrative embodiment of the cable-actuated disc brake for a bicycle disclosed herein.
Figure 11:
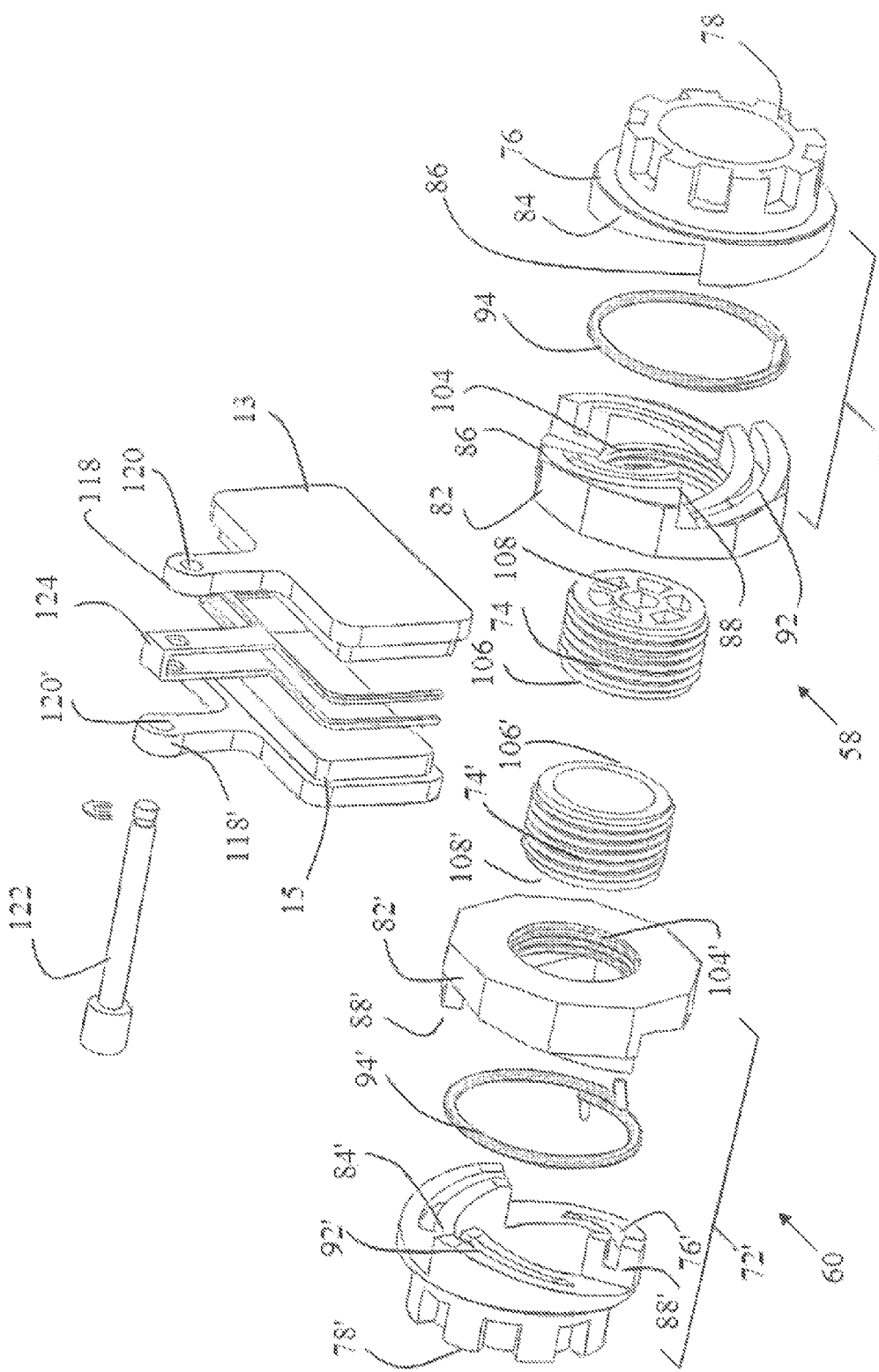
FIG. 11 is an exploded view of an example of a disc brake with the caliper body and the lever removed in accordance with an illustrative embodiment of the cable-actuated disc brake for a bicycle disclosed herein.
Figure 12:
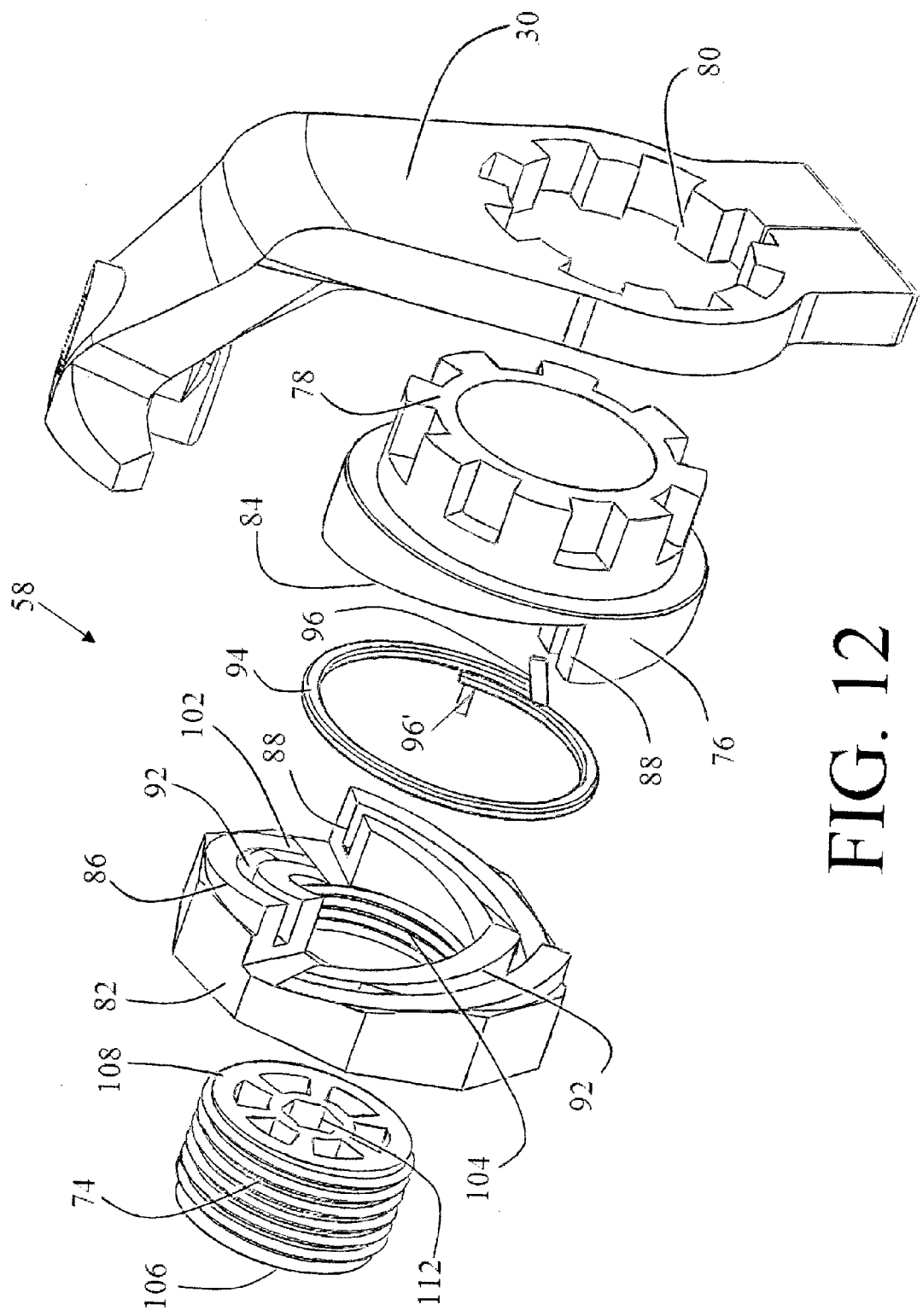
FIG. 12 is an exploded view of an example of a piston assembly and a micro-adjusting fastener in accordance with an illustrative embodiment of the cable-actuated disc brake for a bicycle disclosed herein.
Figure 13:
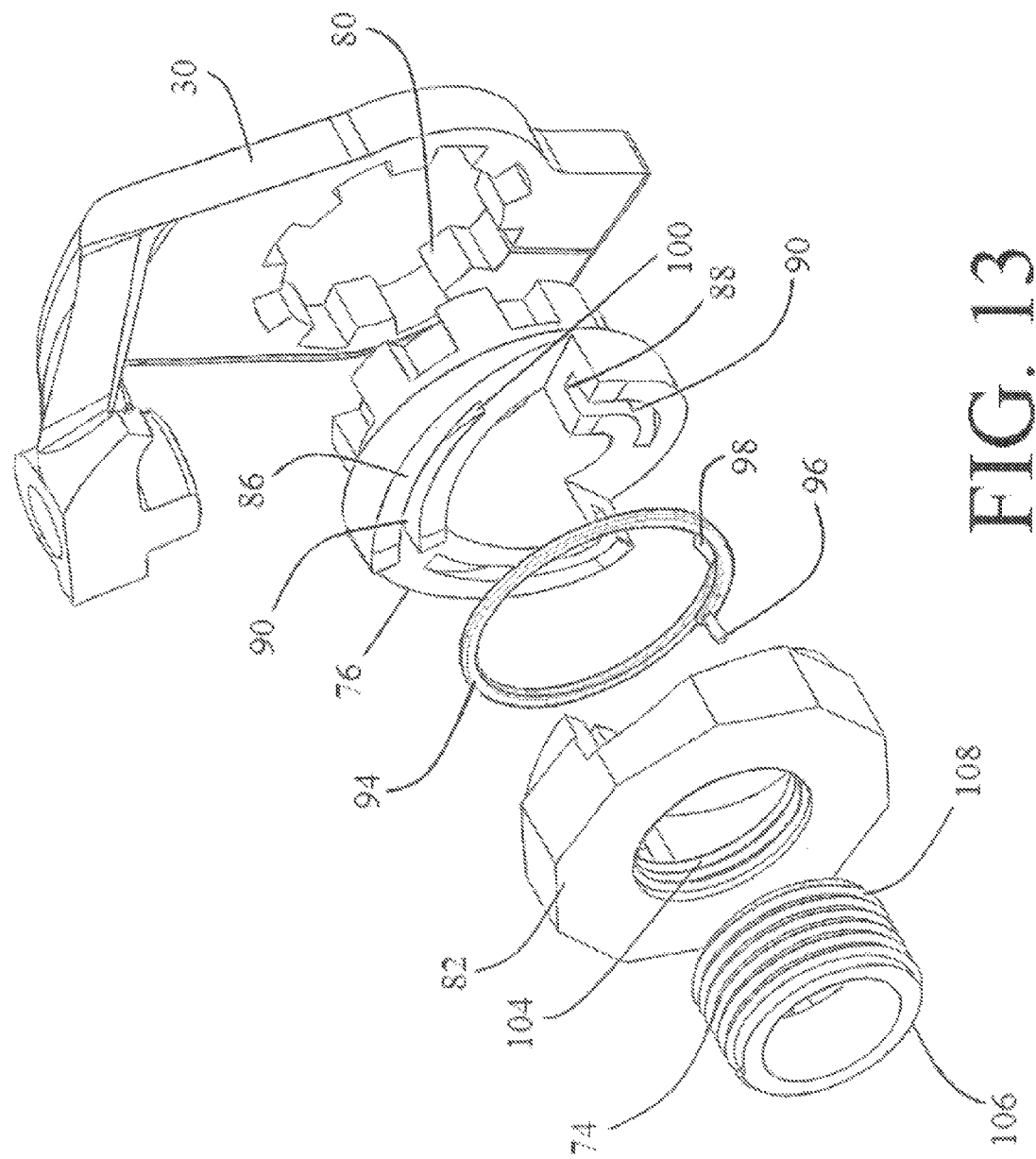
FIG. 13 is another exploded view of the piston assembly and micro-adjusting fastener shown in FIG. 12.

The disc brake 10 is illustrated in exploded perspective views in FIGS. 9 through 11. FIG. 9 is identical to FIG. 10, with the perspective being rotated 180°. FIGS. 9 and 10 show the outboard piston assembly 58 exploded, and as can be seen in FIG. 11, the inboard piston assembly 60 is a mirror image of the outboard piston assembly 58. The inboard piston assembly 60 and the outboard piston assembly 58 are axially aligned, coaxially spaced and rotate about pivot axis 48. The inboard piston assembly 60 and the outboard piston assembly 58 are each respectively mounted within polygonal receptacles 62, 64 in the caliper body 12 and are covered with a caliper plate 66. The caliper plate 66 includes a plurality of apertures 68 through which a plurality of fasteners 70 may be passed to attach the caliper plate 66 to the caliper body 12.

The inboard piston assembly 60 is a mirror image of the outboard piston assembly 58, and as such, the constituent parts of the inboard piston assembly 60 are referenced in the drawings with a prime (') symbol with the same reference number of the outboard piston assembly 58. Each of the piston assemblies 58, 60 includes a spring armature 72 and a cam 74. The spring armature 72 may be constructed of an outer armature body 76 having an outer splined head 78 for connection with a splined aperture 80 in the first end 34 of the lever 14. The spring armature 72 may also include an inner armature body 82 having a polygonal peripheral configuration for connection with a mating polygonal configuration of the polygonal receptacle 62, 64 in the caliper body 12. The medial portions of the outer armature body 76 and the inner armature body 82 have mating tapered ridges 84, 86 that terminate with shoulders 88, 90. Each of the tapered ridges 84, 86 and shoulders 86, 88 includes a channel 90, 92 within which a biasing spring 94 is retained. The biasing spring 94 has opposing projections 96, 98 that fit within receptacles 100, 102 respectively within the channels 90, 92 The inner armature body 82 includes an internally threaded central bore 104. The cam 74 is externally threaded and is secured within the internally threaded central bore 104 of the inner armature body 82. An inner face 106 of the cam 74 is aligned with the midline of the caliper body 12 and is in communication with the brake pad 13. An outer face 108 of the cam 74 includes an adjustment tool bore 112 so that small adjustments to the position of the brake pads 13, 15 can be made.

The brake pads 13, 15 are removably positioned within a brake pad channel 114 along the midline of the caliper body 12. The caliper body 12 includes a pair of retention pin apertures 116, 116' axially aligned and coaxially spaced above the brake pad channel 114. Each of the brake pads 13, 15 includes a protruding boss 118, 118' having a retention pin orifice 120, 120' through which a retention pin 122 is passed. The brake pads 13, 15 are separated by a return spring 124 that pushes the brake pads 13, 15 toward the caliper body 12.

During operation, when the rider desires to slow or stop the bicycle, he/she squeezes the brake lever which actuates the brake cable 40 attached to the lever 14. As the brake cable 40 is actuated by the brake lever, the lever 14 rotates about pivot axis 48 and the splined apertures 62, 64 in the lever arms 30, 32 engage the splined head 78, 78' of the outer armature bodies 76, 76' of the spring armatures 72, 72'. As the outer armature bodies 76, 76' pivot, the projections 96, 96', 98, 98' of the biasing springs 94, 94' engage the receptacles 100, 100', 102, 102' within the channels 92, 92' of the spring armatures 72, 72'. As the spring armatures 72, 72' pivot about pivot axis 48, the tapered ridges 84, 84' of the outer armature bodies 76, 76' slide along the tapered ridges 86, 86' of the inner armature bodies 78, 78', resulting in the inner armature bodies 82, 82' moving inwardly toward the brake pad channel 114 of the caliper body 12. As the inner armature bodies 82, 82' pivot, the cams 74, 74' engage the central bores 104, 104' of the inner armature bodies 82, 82' causing the inner faces 106, 106' of the cams 74, 74' to engage the brake pads 13, 15. The brake pads 13, 15 move to the braking position and engage the brake disc 56 causing the bicycle to slow or stop. When the rider releases the brake lever, the return spring 124 pushes the brake pads 13, 15 back toward the caliper body 12 and the biasing springs 94, 94' release compression and the lever 14 returns to the neutral state.

Whereas, the devices have been described in relation to the drawings and claims, it should be understood that other and further modifications, apart from those shown or suggested herein, may be made within the scope of this invention.

What is claimed is:

1. A cable-actuated disc brake for a bicycle, said disc brake comprising:

a caliper body configured to be attached to a fork of said bicycle; said caliper body comprising a brake pad channel; said caliper body further comprising a pair of polygonal receptacles separated by said brake pad channel;

a lever comprising a first end having symmetrical lever arms and a second end having a brake cable attachment mechanism; said lever pivotable about a pivot axis; and a pair of symmetric piston assemblies connected to said lever arms of said lever; said piston assemblies axially aligned and coaxially spaced about said brake pad channel of said caliper body; each of said piston assemblies further comprising an outer armature body and an inner armature body; each of said inner armature bodies having a polygonal peripheral configuration respectively positioned within and engaged with said polygonal receptacles of said caliper body; each of said outer armature bodies having a series of tapered ridges and terminal shoulders; each of said inner armature bodies having a series of tapered ridges and terminal shoulders that mate with said tapered ridges and terminal shoulders of said outer armature bodies; each of said piston assemblies pivotable about said pivot axis; each of said piston assemblies in contact with a disc brake pad positioned within said brake pad channel of said caliper body;

wherein said piston assemblies transform rotary motion of said lever to linear motion of said brake pads.

2. The disc brake of claim 1 wherein piston assemblies further comprise an inboard piston assembly and an outboard piston assembly.

3. The disc brake of claim 2 wherein each of said piston assemblies further comprises a spring armature assembly connected said lever arms of said lever, respectively, and a cam in contact with said brake pads, respectively.

4. The disc brake of claim 3 wherein said each of said spring armature assemblies further comprises said outer armature body and said inner armature body having a biasing spring intermediate thereof.

5. The disc brake of claim 4 further comprising:
a. each of said outer armature bodies having a splined head connected to a splined aperture in said first end of said lever; each of said ridges and shoulders of said outer armature bodies having a channel therein;
b. each of said ridges and shoulders of said inner armature bodies having a channel therein mating with said channel of said outer armature bodies; and
c. said biasing spring intermediate of each of said outer armature bodies and said inner armature bodies; said biasing spring retained within said channels of said outer armature bodies and said inner armature bodies.

6. The disc brake of claim 5 wherein said biasing spring has opposing projections in communication with receptacles within said channels of said outer armature bodies and said inner armature bodies.

7. The disc brake of claim 5 wherein each of said armature bodies has a central bore in communication with said cam.

8. The disc brake of claim 7 wherein said cam further comprises an inner face in connection with said brake pad.

9. The disc brake of claim 8 wherein said cam has external threads engaged with internal threads of said central bore of said armature bodies.

10. The disc brake of claim 1 further comprising a return spring in connection with said brake pads for biasing said brake pads toward a neutral position.

11. A cable-actuated disc brake for a bicycle, said disc brake comprising:
a caliper body attachable to a fork of said bicycle, said caliper body comprising a brake pad channel having a pair of disc brake pads positioned therein;
a return spring positioned intermediate of and in connection with said brake pads for biasing said brake pads toward a neutral position;
a lever comprising a first end having symmetrical lever arms with splined apertures therein, and a second end having a brake cable attachment mechanism; said lever pivotable about a pivot axis;
an inboard piston assembly and an outboard piston assembly; said inboard piston assembly being a mirror image of said outboard piston assembly, each of said piston assemblies connected to said lever arms of said lever; said piston assemblies axially aligned and coaxially spaced about said brake pad channel of said caliper body; each of said piston assemblies pivotable about said pivot axis; each of said piston assemblies in contact with one of said disc brake pads positioned within said brake pad channel of said caliper body; each of said piston assemblies further comprising a spring armature connected said lever arms of said lever, respectively, and a cam in contact with said brake pads, respectively; each of said spring armatures further comprising:
an outer armature body and an inner armature body with a biasing spring intermediate thereof;
each of said outer armature bodies having a splined head connected to said splined aperture in said first end of said lever; each of said outer armature bodies having a series of tapered ridges and terminal shoulders; each of said ridges and shoulders having a channel therein;
each of said inner armature bodies having a series of tapered ridges and terminal shoulders that mate with said tapered ridges and terminal shoulders of said outer armature bodies; each of said ridges and shoulders having a channel therein mating with said channel of said outer armature bodies;
said biasing spring retained within said channels of said outer armature bodies and said inner armature bodies;
wherein said piston assemblies transform rotary motion of said lever to linear motion of said brake pads.

12. The disc brake of claim 11 wherein said caliper body further comprises a pair of polygonal receptacles separated by said brake pad channel; a portion of said piston assemblies respectively positioned within said receptacles of said caliper body, and at portion of said piston assemblies respectively covered by a caliper plate configured to be attached to said caliper body.

13. The disc brake of claim 11 wherein each of said inner armature bodies has a polygonal peripheral configuration for connection with a polygonal configuration of a pair of polygonal receptacles separated by said brake pad channel of said caliper body.

14. The disc brake of claim 11 wherein said biasing spring has opposing projections in communication with receptacles within said channels of said outer armature bodies and said inner armature bodies.

15. The disc brake of claim 11 wherein each of said armature bodies has a central bore in communication with said cam; and wherein each of said cams further comprises an inner face in connection with said brake pad, respectively.

16. The disc brake of claim 15 wherein said cam has external threads engaged with internal threads of said central bore of said armature bodies.

17. A cable-actuated disc brake for a bicycle, said disc brake comprising:
a caliper body configured to be attached to a fork of said bicycle; said caliper body comprising a brake pad channel;
a lever comprising a first end having symmetrical lever arms and a second end having a brake cable attachment mechanism; said lever pivotable about a pivot axis; and
a pair of symmetric piston assemblies connected to said lever arms of said lever; said piston assemblies axially aligned and coaxially spaced about said brake pad channel of said caliper body; each of said piston assemblies further comprising an outer armature body and an inner armature body; each of said outer armature bodies having a series of tapered ridges and terminal shoulders; each of said inner armature bodies having a series of tapered ridges and terminal shoulders that mate with said tapered ridges and terminal shoulders of said outer armature bodies; each of said piston assemblies pivotable about said pivot axis; each of said piston assemblies in contact with a disc brake pad positioned within said brake pad channel of said caliper body;
wherein said piston assemblies transform rotary motion of said lever to linear motion of said brake pads.

18. The disc brake of claim 17 wherein piston assemblies further comprise an inboard piston assembly and an outboard piston assembly.

19. The disc brake of claim 18 wherein said outer armature body and said inner armature body further comprises a spring armature assembly connected said lever arms of said lever, respectively, and a cam in contact with said brake pads, respectively.

20. The disc brake of claim 17 further comprising:
a. each of said outer armature bodies having a splined head connected to a splined aperture in said first end of said lever; each of said ridges and shoulders of said outer armature bodies having a channel therein;

b. each of said ridges and shoulders of said inner armature bodies having a channel therein mating with said channel of said outer armature bodies; and c. a biasing spring intermediate of each of said outer armature bodies and said inner armature bodies; said biasing spring retained within said channels of said outer armature bodies and said inner armature bodies.

21. The disc brake of claim 17 wherein each of said armature bodies has a central bore in communication with a cam; said cam having external threads engaged with internal threads of said central bore of said armature bodies.

\* \* \* \* \*